US011746642B2

(12) United States Patent
Guner et al.

(10) Patent No.: US 11,746,642 B2
(45) Date of Patent: Sep. 5, 2023

(54) ELECTROMAGNETIC IMAGER DESIGN

(71) Applicant: Halliburton Energy Services, Inc., Houston, TX (US)

(72) Inventors: Baris Guner, Houston, TX (US); Luis Emilio San Martin, Houston, TX (US); Gary Wayne Kainer, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 591 days.

(21) Appl. No.: 16/679,002

(22) Filed: Nov. 8, 2019

(65) Prior Publication Data

US 2021/0140301 A1 May 13, 2021

(51) Int. Cl.
| | | |
|---|---|---|
| *E21B 47/002* | (2012.01) | |
| *G01N 21/85* | (2006.01) | |
| *E21B 49/08* | (2006.01) | |
| *G01V 3/18* | (2006.01) | |

(52) U.S. Cl.
CPC .......... *E21B 47/002* (2020.05); *E21B 49/087* (2013.01); *G01N 21/85* (2013.01); *G01V 3/18* (2013.01)

(58) Field of Classification Search
CPC ..... E21B 47/002; E21B 49/087; G01N 21/85; G01V 3/18; G01V 3/24
See application file for complete search history.

(56) References Cited

U.S. PATENT DOCUMENTS

| | | |
|---|---|---|
| 3,060,373 A | 10/1962 | Doll |
| 3,132,298 A | 5/1964 | Doll et al. |
| 3,379,963 A | 4/1968 | Saurenman |
| (Continued) | | |

FOREIGN PATENT DOCUMENTS

| | | |
|---|---|---|
| CA | 685727 | 5/1964 |
| EP | 2315056 | 4/2011 |
| (Continued) | | |

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.

(Continued)

*Primary Examiner* — Manuel A Rivera Vargas
*Assistant Examiner* — Yaritza H Perez Bermudez
(74) *Attorney, Agent, or Firm* — John Wustenberg; C. Tumey Law Group PLLC

(57) ABSTRACT

A method for identifying an operating frequency may comprise performing a frequency sweep using one or more injector electrodes disposed on a downhole tool, recording one or more measurements from the frequency sweep, identifying one or more stable frequencies from the frequency sweep, and identifying one or more operating frequencies from the one or more stable frequencies. A system for electrical isolation may comprise a downhole tool, a pad, an arm, wherein the arm is attached to the mounting bracket and the mandrel, and an information handling system connected to the pad through the first set of electronics and the second set of electronics. The downhole tool may comprise a mandrel, a chassis disposed in the mandrel, and a first set of electronics disposed in the chassis.

20 Claims, 11 Drawing Sheets

(56) References Cited

U.S. PATENT DOCUMENTS

| | | | |
|---|---|---|---|
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A * | 4/1991 | Chen ............ G01V 3/38 324/366 |
| 5,038,378 | A | 8/1991 | Chen |
| 5,191,290 | A | 3/1993 | Gianzero et al. |
| 6,191,588 | B1 | 2/2001 | Chen |
| RE42,493 | E | 6/2011 | Tabarovsky et al. |
| 7,974,380 | B2 * | 7/2011 | Fowler ............ G01N 23/20025 378/208 |
| 8,232,803 | B2 | 7/2012 | Bloemenkamp |
| 8,579,037 | B2 | 11/2013 | Jacob |
| 2007/0246649 | A1 * | 10/2007 | Jacobi ............ G01V 5/12 250/269.6 |
| 2013/0068449 | A1 * | 3/2013 | Pillai ............ C21D 9/00 420/104 |
| 2013/0293235 | A1 | 11/2013 | Bloemenkamp et al. |
| 2014/0239960 | A1 | 8/2014 | Habashy et al. |
| 2016/0290938 | A1 * | 10/2016 | Bruzenak ............ G01N 23/2005 |
| 2017/0212269 | A1 | 7/2017 | Itskovich et al. |
| 2017/0285212 | A1 | 10/2017 | Bloemenkamp |
| 2017/0371070 | A1 * | 12/2017 | Teyssandier ............ G01V 13/00 |
| 2018/0112126 | A1 * | 4/2018 | Yang ............ C09K 8/58 |

FOREIGN PATENT DOCUMENTS

| | | | |
|---|---|---|---|
| WO | WO-2015027340 A1 * | 3/2015 | ............ E21B 47/121 |
| WO | 2019177588 | 9/2019 | |

OTHER PUBLICATIONS

Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.
International Search Report and Written Opinion for Application No. PCT/US2019/063689, dated Aug. 3, 2020.

* cited by examiner

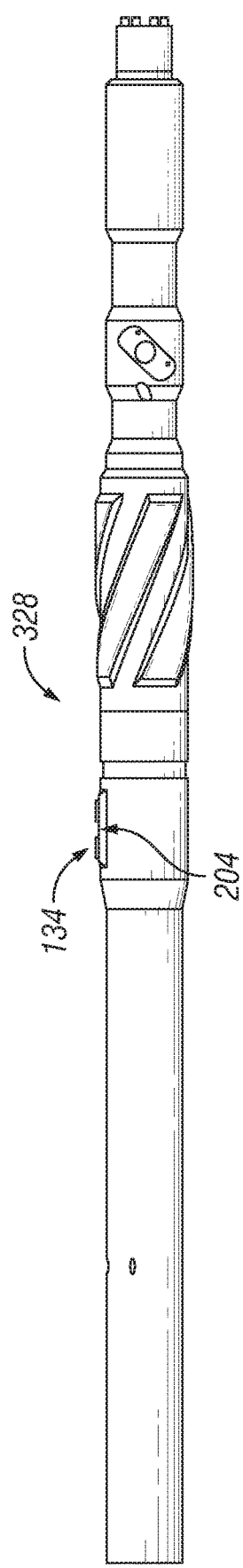
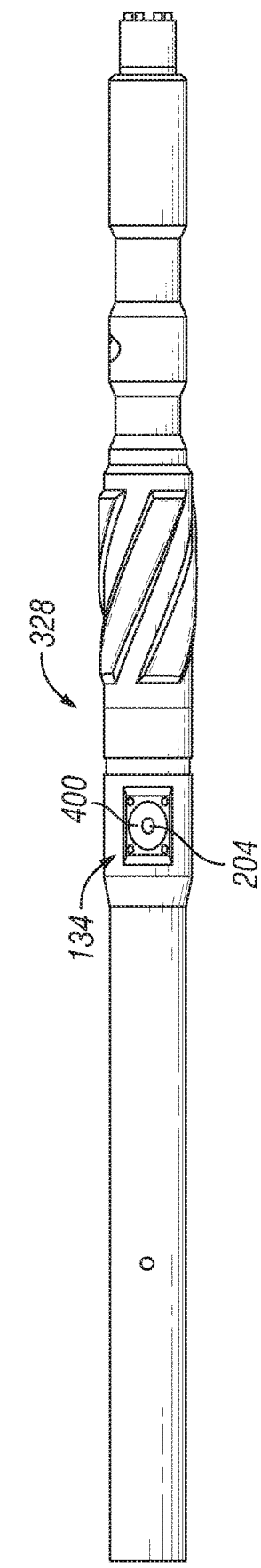
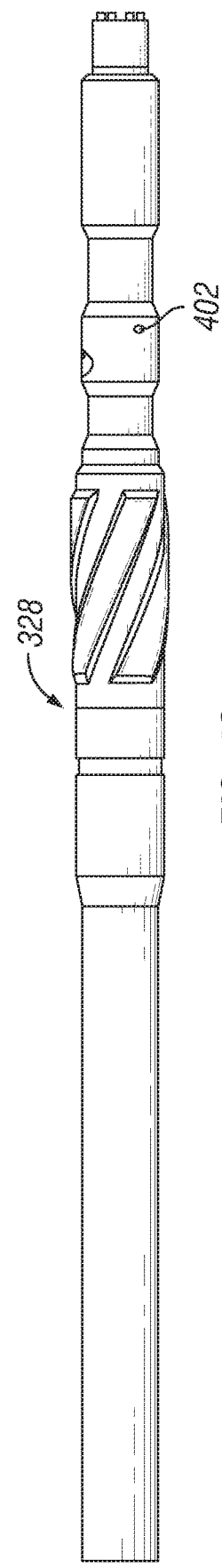
FIG. 4A
FIG. 4B
FIG. 4C

ELECTROMAGNETIC IMAGER DESIGN

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds, fracture locations, and low resistivity formations. To detect thin beds, fracture locations, and low resistivity formations borehole imager may transmit a current through an injector electrode into the formation. A return electrode may record the current after the current has passed through the formation. Measuring this current may allow an operator to determine characteristic and properties of thin beds, fracture locations, and low resistivity formations. During measurement operations current may pass from the injector electrode and "leak" through the formation and into the downhole tool and not the return electrode. This may reduce the sensitivity of the borehole imager tools to the low resistivity formations. A manifestation of the current leakage is the nonlinearity of the phase response of the tool with respect to frequency. Phase response of an ideal mud imager tool is expected to be a slowly changing function of frequency for the range of frequencies the tool is employed. However, in practice, phase response of the tool is observed to be highly nonlinear and to exhibit a resonance type behavior due to the current leakage. Furthermore, frequency response of different pads may vary based on their axial location on the mandrel.

BRIEF DESCRIPTION OF THE DRAWINGS

For a detailed description of the examples of the disclosure, reference will now be made to the accompanying drawings in which:

FIGS. 4A-4C illustrate an example of a pad;

DETAILED DESCRIPTION

The present disclosure discloses a system and method for optimization of downhole tool performance through the measurement of a phase response of the downhole tool with respect to frequency. The proposed method may measure the phase response of the downhole tool to determine the frequencies where the downhole tool is stable (i.e., away from the resonance) for each measurement unit (such as each pad) and select operating frequencies of the downhole tool based on this information. The proposed system and method may increase the ability for the pad to sense and measure a low resistivity formation and reduce noise levels in the measurements through the optimization of the operating frequency.

Additionally, the present disclosure relates methods for electrically isolating a pad from a mandrel of a downhole tool. For example, current emitted by an injector electrode from the pad may travel, or "leak," through the formation, into the downhole tool, and through the pad to a return electrode disposed on the pad. The return electrode may measure the "leakage current," which may be identified as part of a formation. Additionally, the measured "leakage current" may include more amps than current measured from the formation. Therefore the "leakage current" may washout and/or cover the measured current from the formation, which may lead to skewed and/or false measurements. This leakage current is the primary cause of the resonances in the tool response. Reducing the leakage current will make the optimization of the operating frequency easier and more robust. Thus, it may be beneficial to design and build a system that may prevent "leakage current" from being measured by the return electrode.

Figure 1:
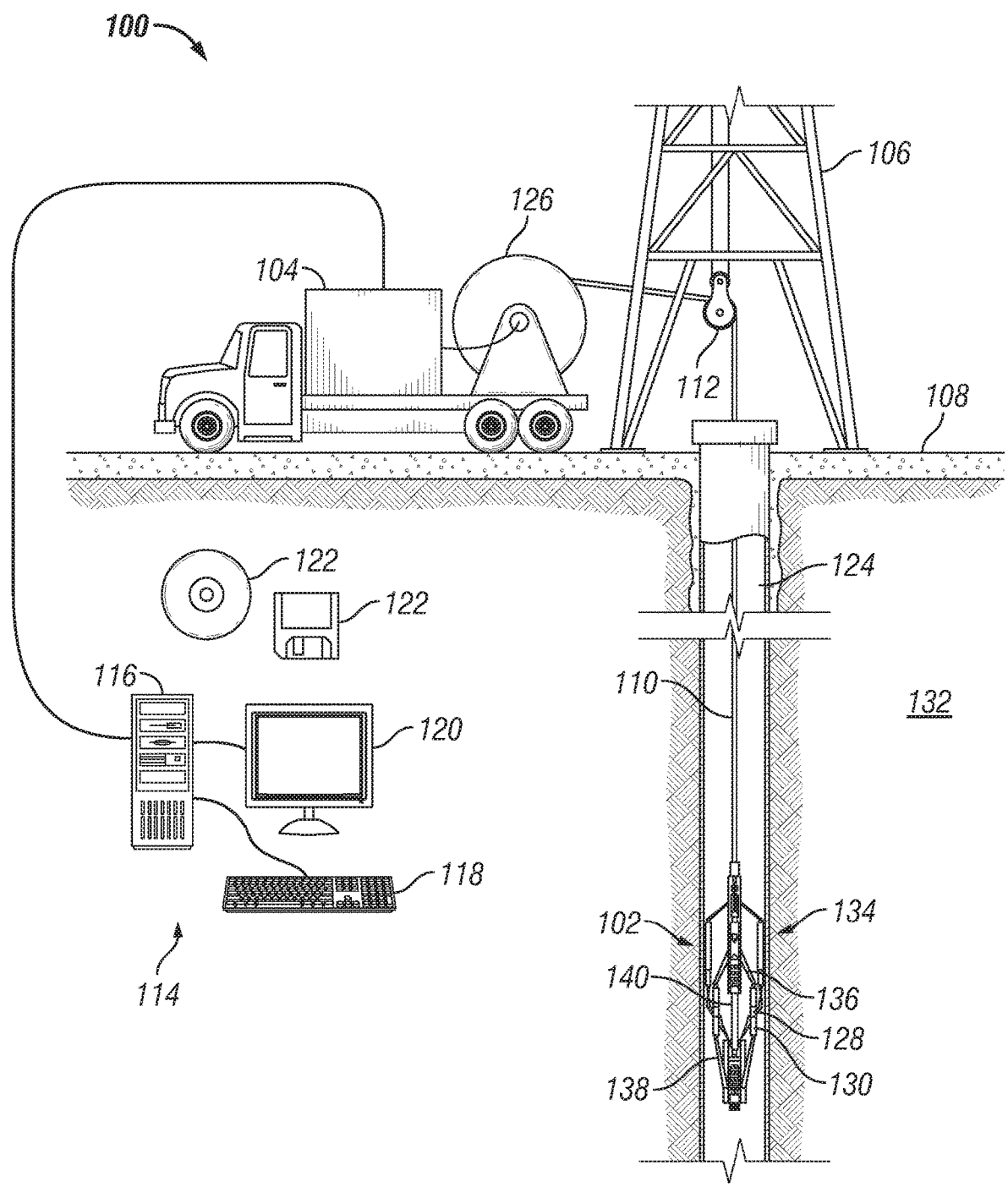
FIG. 1 illustrate an example of a well measurement system.

FIG. 1 illustrates a cross-sectional view of an example of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. This high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

In examples, rig 106 includes a load cell (not shown) which may determine the amount of pull on conveyance 110 at the surface of borehole 124. Information handling system 114 may include a safety valve which controls the hydraulic pressure that drives drum 126 on vehicle 104 which may reel up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may include a plurality of electrodes, such as button array 128. Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode of button array 128 and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be emitted from at least one electrode from button array 128 and return to return electrode 130. In examples, current may be emitted from any transmission type electrode along downhole tool 102. These two electrodes may be referred to as the current electrodes. Then, the voltage drop across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil-based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
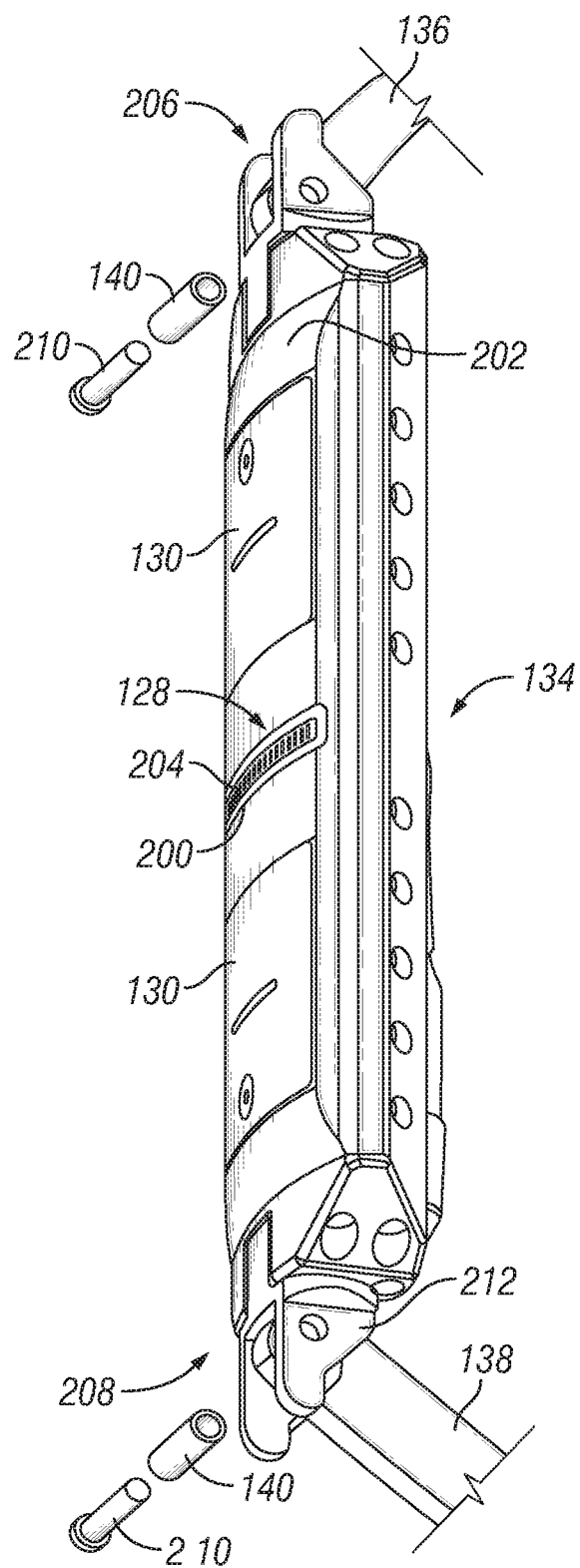
FIG. 2 illustrates an example of a pad.

FIG. 2 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may include a button array 128, a return electrode 130, a guard 200, and a housing 202. In examples, there may be a plurality of button arrays 128. In examples, return electrode 130 and button array 128 may be disposed directly on downhole tool 102. Button array 128 may include an injector electrode 204, wherein injector electrode 204 may be a sensor that senses impedance of formation 132. It should be noted that injector electrode 204 may be a button electrode. There may be any suitable number of injector electrodes 204 within button array 128 that may produce a desired, predetermined current. Without limitation, the range for a suitable number of injector electrodes 204 within button array 128 may be from about one injector electrode 204 to about one hundred injector electrodes 204. For example, the range for a suitable number of injector electrodes 204 within button array 128 may be from about one injector electrode 204 to about twenty-five injector electrodes 204, from about twenty-five injector electrodes 204 to about fifty injector electrodes 204, from about fifty injector electrodes 204 to about seventy-five injector electrodes 204, or from about seventy-five injector electrodes 204 to about one hundred injector electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 204 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. These two electrodes may be referred to as the current electrodes. Then, the voltage drops across button array 128 may be measured and used to estimate the impedance of formation 132. In these alternative implementations, injector electrodes 204 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality.

Guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 202 may be a metal plate. Housing 202 may be connected through upper arm 136 to downhole tool 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between an injector electrode 204 and formation 132 for each injector electrode 204. The voltage between button array 128 and return electrodes 130 may be measured and divided by the transmitted current to produce a value for the impedance seen by each injector electrode 204. Most of the transmitted current may be returned to return electrodes 130 although some portions of it may return through housing 202 and downhole tool 102 (e.g., referring to FIG. 1).

During logging operations, measurement data taken by pad 134 may include resistivity and permittivity. Measurements of resistivity and permittivity may contain contributions from oil-based mud that is may be disposed between pad 134 and the wall of borehole 124 as well as the signal coming from the formation. To accurately estimate formation resistivity and formation permittivity, downhole oil-based mud properties may be measured. Currently, there is no mud cell used in downhole tool 102, thus downhole mud properties may be determined from measurements already taken by downhole tool 102. As discussed below, broadband oil-based mud properties may be determined from multi-frequency measurements data as well as physical borehole 124 and/or pad 134 information.

In general, the measurement medium of pad 134 may be modeled as a homogeneous formation with a thin layer of oil-based mud between pad 134 and formation 132. When pad 134 is placed on formation 132 without a mud layer, response measurement may only be from formation 132. However, when there is a mud layer present, the response is influenced by the thickness of the mud layer as well as the mud properties, in addition to the properties of formation 132 behind the mud layer. That being said, the response for certain formations 132 predominantly consist of the mud signal, which may make this response suitable for determining mud properties.

Figure 3:
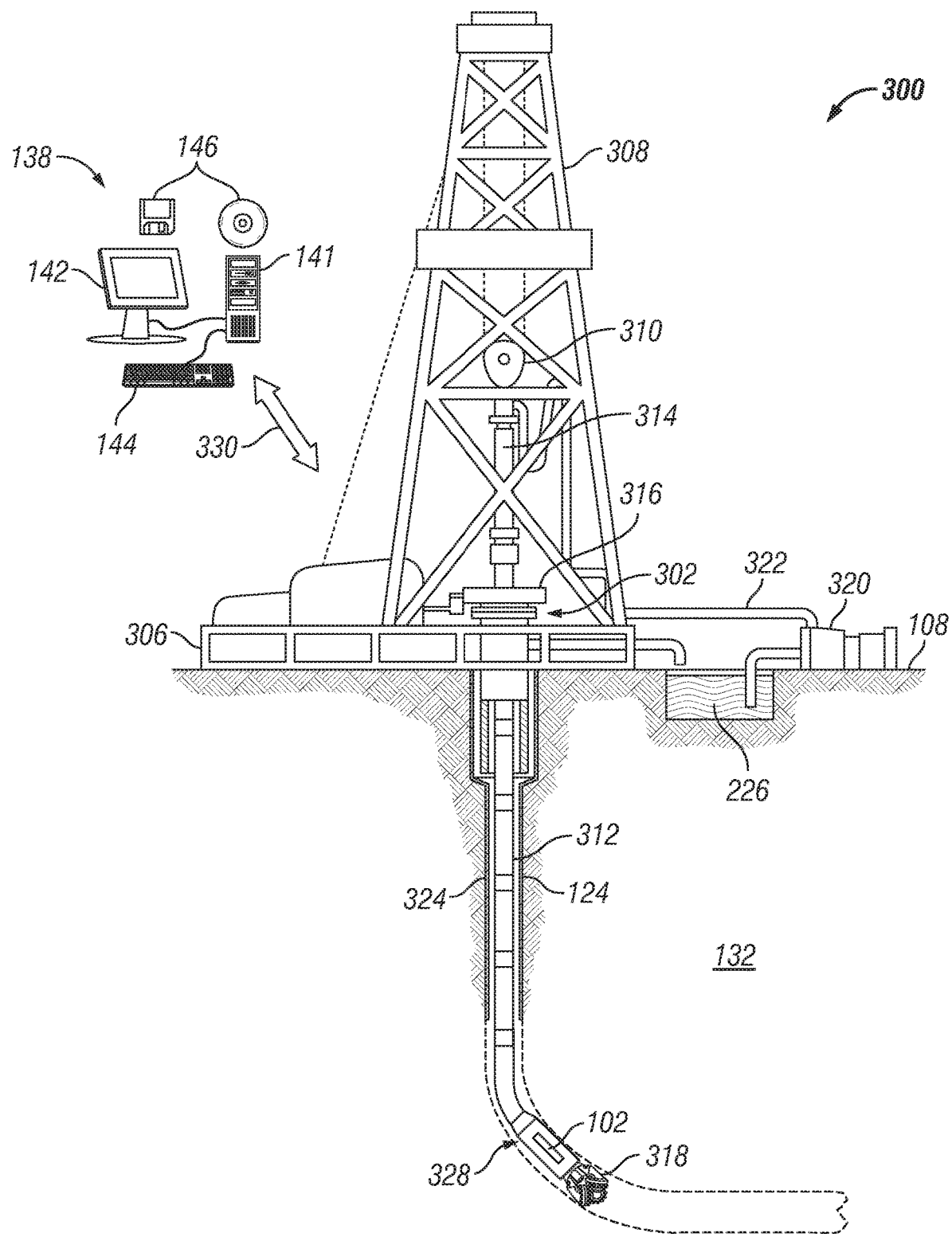
FIG. 3 illustrates another example of a well measurement system.

FIG. 3 illustrates an example in which downhole tool 102 may be disposed in a drilling system 200. As illustrated, borehole 124 may extend from a wellhead 302 into formation 132 from surface 108. As illustrated, a drilling platform 306 may support a derrick 308 having a traveling block 310 for raising and lowering drill string 312. Drill string 312 may include, but is not limited to, drill pipe and coiled tubing, as generally known to those skilled in the art. A kelly 314 may support drill string 312 as it may be lowered through a rotary table 316. A drill bit 318 may be attached to the distal end of drill string 312 and may be driven either by a downhole motor and/or via rotation of drill string 312 from surface 108. Without limitation, drill bit 318 may include, roller cone bits, PDC bits, natural diamond bits, any hole openers, reamers, coring bits, and the like. As drill bit 318 rotates, it may create and extend borehole 124 that penetrates various formations 132. A pump 320 may circulate drilling fluid through a feed pipe 322 to kelly 314, downhole through interior of drill string 312, through orifices in drill bit 318, back to surface 108 via annulus 324 surrounding drill string 312, and into a retention pit 326.

With continued reference to FIG. 3, drill string 312 may begin at wellhead 302 and may traverse borehole 124. Drill bit 318 may be attached to a distal end of drill string 312 and may be driven, for example, either by a downhole motor and/or via rotation of drill string 312 from surface 108. Drill bit 318 may be a part of bottom hole assembly 328 at distal end of drill string 312. Bottom hole assembly 328 may further include downhole tool 102. Downhole tool 102 may be disposed on the outside and/or within bottom hole assembly 328. Downhole tool 102 may include test cell 334. As will be appreciated by those of ordinary skill in the art, bottom hole assembly 328 may be a measurement-while drilling (MWD) or logging-while-drilling (LWD) system.

Without limitation, bottom hole assembly 328 may be connected to and/or controlled by information handling system 114, which may be disposed on surface 108. Without limitation, information handling system 114 may be disposed down hole in bottom hole assembly 328. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 328 may be brought to surface 108. In examples, information handling system 114 may communicate with bottom hole assembly 328 through a fiber optic cable (not illustrated) disposed in (or on) drill string 312. In examples, wireless communication may be used to transmit information back and forth between information handling system 114 and bottom hole assembly 328. Information handling system 114 may transmit information to bottom hole assembly 328 and may receive as well as process information recorded by bottom hole assembly 328. In examples, a downhole information handling system (not illustrated) may include, without limitation, a microprocessor or other suitable circuitry, for estimating, receiving and processing signals from bottom hole assembly 328. Downhole information handling system (not illustrated) may further include additional components, such as memory, input/output devices, interfaces, and the like. In examples, while not illustrated, bottom hole assembly 328 may include one or more additional components, such as analog-to-digital converter, filter and amplifier, among others, that may be used to process the measurements of bottom hole assembly 328 before they may be transmitted to surface 108. Alternatively, raw measurements from bottom hole assembly 328 may be transmitted to surface 108.

Any suitable technique may be used for transmitting signals from bottom hole assembly 328 to surface 108, including, but not limited to, wired pipe telemetry, mud-pulse telemetry, acoustic telemetry, and electromagnetic telemetry. While not illustrated, bottom hole assembly 328 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 330, which may be a wired or wireless link. The telemetry data may be analyzed and processed by information handling system 114.

As illustrated, communication link 330 (which may be wired or wireless, for example) may be provided that may transmit data from bottom hole assembly 328 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

FIGS. 4A-4C illustrate an example of bottom hole assembly 328 that includes another example of pads 134. In examples there may be any number of pads 134 disposed on bottom hole assembly 328 that may operate and function to perform imaging operations in oil based muds. It should be noted that water based mud imagers may have similar designs, and may generally provide less design and interpretation complications than oil based mud imagers due to the conductive nature of the water based mud. Bottom hole assembly 328 may operate in a logging-while-drilling (LWD) and/or measuring-while-drilling (MWD) imaging. As described below, bottom hole assembly 328 may provide a high resolution image of borehole 124 (e.g., referring to FIG. 3) and may be used to identifying damage sections of borehole 124. This may provide knowledge on thin beds in formation 132 and also provide images that may be used to determine a dip angle of formation beds.

In this example, pad 134 may be attached directly to bottom hole assembly 328 and may not utilize one or more arms. Without limitation, pad 134 may serve to place pad 134 and/or injector electrode 204 in contact with or in close proximity to borehole 124 (e.g., referring to FIG. 3). Pad 134 may include an injector electrode 204 and guard electrode 400. Guard electrode 400 may surround injector electrode 204. In examples, guard electrode 400 may be excited by an alternating current, sine-wave generator, and it may be coupled to formation 132 (e.g., referring to FIG. 3) through the oil based mud. The mud is non-conductive for oil based muds, consequently, the coupling to formation 132 by displacement currents in mud 132. This arrangement provides a low sensitivity to standoff changes in the microresistivity image. This may allow injector electrode 204 and guard electrode 400 may operate and function to sense impedance of formation 132 (e.g., referring to FIG. 3).

In an LWD environment, the sensor topology can have minimum complexity, and more importantly, may not rely on contact with borehole 124 (e.g., referring to FIG. 3). During measurement operations, a current enters formation 132 from injector electrode 204, which may have a much lower resistivity than the mud. In formation 132, the current density flows by conduction. The current penetrates formation 132 and then returns back toward borehole 124 where it returns to bottom hole assembly 328. The body of bottom hole assembly 328 may remain at ground potential because of its large surface area.

Imaging is accomplished by dividing data into azimuthal bins as bottom hole assembly 328 (e.g., referring to FIG. 3) rotates in borehole 124 (e.g., referring to FIG. 3) during drilling operations. As illustrated in FIGS. 4A-4C, bottom hole assembly 328 may include an additional mud resistivity sensor 402. The real component of measurements taken by injector electrode 204 may be used to determine formation resistivity, whereas mud resistivity measurement from mud resistivity sensor 402 is used to validate the formation resistivity measurement. During operations, multiple frequencies may be used by bottom hole assembly 328. In examples, a higher frequency in the MHz range may be used to overcome the nonconductive mud for oil based muds while a lower frequency in the 100 kHz range may be more sensitive to standoff and thus may be used in standoff determination. Standoff information may be used to identify features in formation 132 (e.g., referring to FIG. 3). For example, a thin band of increased resistivity is due to an opening in the rock if it also shows as a jump in apparent standoff, but is more likely a thin bed if little change is recorded in apparent standoff.

Figure 5:
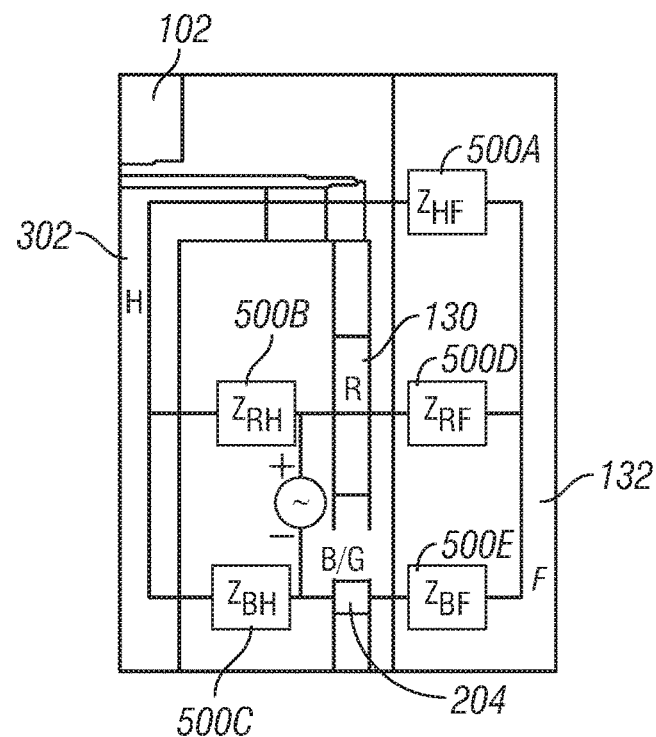
FIG. 5 is a graph illustrating current measurements on an isolated pad from FIG. 2.

FIG. 5 illustrates an example of a circuit model that may approximate the pad 134 illustrated in FIG. 2. Effects of the transmitted current may be approximately characterized by a housing-to-formation impedance value 500A, a return electrode-to-housing impedance value 500B, a return electrode-to-formation impedance value 500C, a button-to-housing impedance value 500D, and a button-to-formation impedance value 500E. Impedance may be calculated below, wherein Z is the impedance, $V_{BR}$ is the button-to-return electrode voltage and $I_B$ is the button current:

$$Z = \frac{V_{BR}}{I_B} \qquad (1)$$

The value calculated in Equation (1) may be equal to $Z_{BF}+Z_{RF}$, as shown in FIG. 5, wherein $Z_{BF}$ is the impedance from injector electrode 204 to formation 132 and $Z_{RF}$ is the impedance of return electrode 130 to formation 132. Note that for different injector electrodes 204 of the button array 128, these impedances may differ based on the variations in borehole 124 (e.g., referring to FIGS. 1 and 2) and the environment. These variations in measured impedances in an impedance image may be used to determine geophysical features. Also note that both $Z_{BF}$ and $Z_{RF}$ have contributions from both the surrounding mud and formation 132 (e.g., referring to FIG. 1). Thus, equivalently it can be written in Equation (2) as:

$$Z \approx Z_{BF} = Z_{mud} + Z_F \qquad (2)$$

As a result, measured impedance may have contributions from both the mud and formation 132, wherein $Z_{mud}$ is the impedance of the mud and $Z_F$ is the impedance of formation 132. Imaginary parts of $Z_F$ and $Z_{mud}$ may be assumed to be mainly capacitive. Assuming this capacitance may be in parallel with the resistive portion, then $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \qquad (3)$$

wherein $R_M$ is the mud resistance, $R_F$ is the resistance of formation 132, $C_M$ is the mud capacitance, $C_F$ is the capacitance of formation 132, j is the unit imaginary number, and ω is the angular frequency. Both the mud resistance and mud capacitance may increase as standoff increases and may decrease with the increase in effective area of injector electrode 204. "Standoff" may be used to denote the distance of the pad 134 (e.g., Referring to FIG. 3) from a wall of borehole 124 (e.g., referring to FIG. 1). Standoff of each injector electrode 204 in button array 128 may vary. In examples, standoffs of return electrode 130 may differ from those of injector electrodes 204 as well. Standoff variations may significantly affect button-to-formation impedance value 500E. In the simplified circuit model, it may be assumed that the standoff of each component of pad 134 may be constant. Standoff may assume that pad 134 is movable while downhole tool 102 remains immobile. In examples, to achieve large distances from the wall of borehole 124, downhole tool 102 may be moved along with pad 134. In examples, the term "eccentricity" may be used instead of "standoff". The proposed methods (discussed further below) may be equally valid whether pad 134 moves or both pad 134 and downhole tool 102 move.

Figure 6:
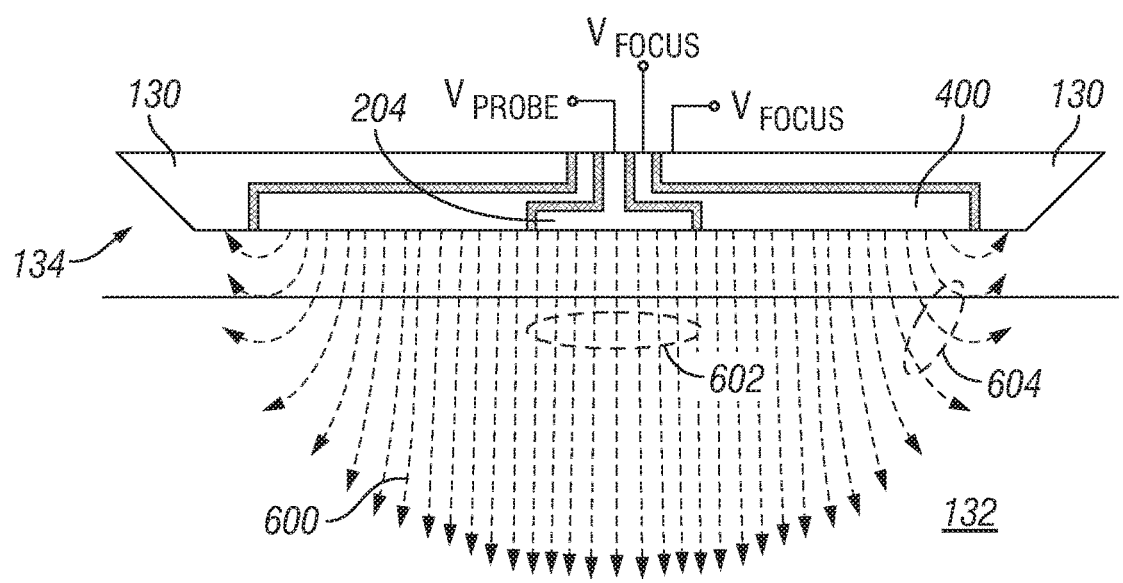
FIG. 6 is a graph illustrating current measurement on an isolated pad from FIGS. 4A-4C.

FIG. 6 shows a cross-sectional view of pad 134 disposed on bottom hole assembly 328 (e.g., referring to FIGS. 4A-4C). As illustrated, injector electrode 204 and guard electrode 400 illustrated electric-current-density lines 600. Electric-current-density lines 600 emanate from injector electrode 204 and guard electrode 400 into formation 132 while remaining parallel in the region close to injector electrode 204, which is further identified in area 602. Near the edges of guard electrode 204, electric-current-density lines 600 may diverge, as illustrated in area 604. The accuracy of the resistivity measurement and the ability to operate without significant sensitivity to standoff is dependent upon maintaining electric-current-density lines 600 that are parallel, as show in area 602. When the standoff distance becomes large enough, electric-current-density lines 600 inside of area 602 will become non-parallel, and the resistivity measurement will become sensitive to standoff.

With continued reference to FIG. 6, a power source drives a voltage between the return electrode 130 and the other electrodes and a circuit is designed to keep $V_{probee}$ equal to $V_{focus}$ for focusing. The current transmitted from the button electrode is measured, for example through the use of a toroid. The apparent formation resistivity $R_a$ may be determined in accordance with ohm's law:

$$R_a = k\frac{V}{I} \qquad (4)$$

where k is a calibration constant, V is the magnitude of the power source and I is the in-phase magnitude of the current flow from the measurement electrode. It should be recognized that the apparent formation resistivity given by equation (1) is only a first order approximation. Information from the mud cell may be used to further improve the accuracy of the measured apparent resistivity.

Mud cell provides measure of mud resistivity $r_M$ and capacity $c_M$. When the impedance of the thin mud layer is included in the measurements by the sensing surface, we see that $$R_a = k\frac{V}{I} = R_F + R_M \qquad (5)$$

where $R_F$ is the formation resistivity and $R_M$ is resistivity of mud layer. $R_M$ is proportional to the standoff (i.e., the thickness of the mud layer) and mud resistance and capacitance from mud cell measurement.

$$R_M \sim \left( r_M d \,//\, \frac{d}{jwc_M} \right) \qquad (6)$$

or $$R_M \sim \frac{1}{\frac{1}{r_M d} + \frac{jwc_M}{d}} \qquad (7)$$

The apparent resistivity is function of frequency, conductivity and dielectric permittivity of the mud and the formation resistivity. It should be noted, for pad 134 disposed on bottom hole assembly 328 (e.g., referring to FIGS. 4A-4C) the dielectric permittivity of formation 132 (e.g., referring to FIG. 3) is ignored in this example and may be corrected using higher order processing methods.

Figure 7:
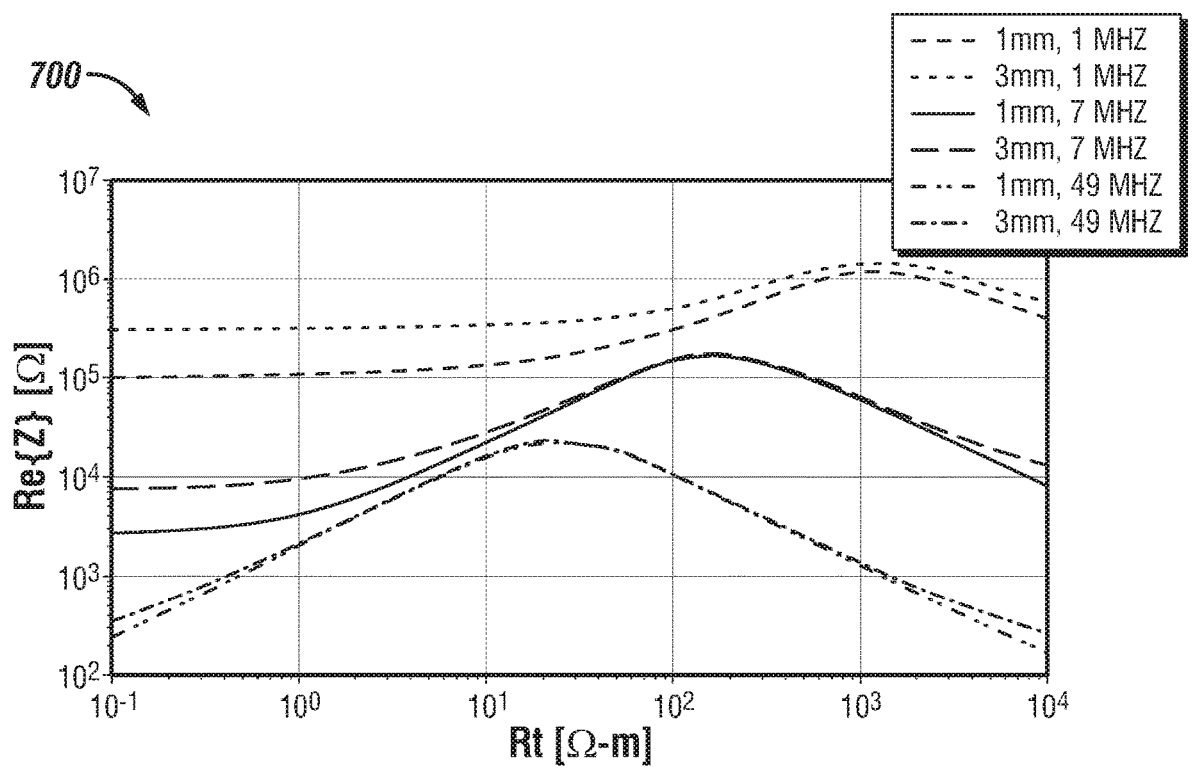
FIG. 7 is a graph illustrating current measurements on a non-isolated pad.

FIG. 7 illustrates a graph of measured impedance versus formation resistivity found using pad 134 (e.g., referring to FIGS. 1 and 3). Equation (3) may be used to obtain basic performance curves for downhole tool 102. These basic performance curves may be fairly accurate in homogeneous formations 132 (e.g., referring to FIG. 1) in determining the variation of the response of an exemplary injector electrode 204 in button array 128 with changing environmental parameters. In FIG. 7, the real part of the measured impedance versus the formation resistivity may be determined using Equation (3), which is illustrated on graph 700 in FIG. 7. The imaginary part of the impedance may be determined by the mud capacitance, therefore it may not be necessary to plot it. In an example, illustrated in FIG. 7, it may be assumed that formation permittivity (εF) is 15, mud permittivity (εM) is 6, and mud resistivity (ρM) is 8000 Ω-m. Results for three different frequencies (1 MHz, 7 MHz and 49 MHz) at two different standoffs (so=1 mm and so=3 mm), where (so) stands for standoff of the tool, may be displayed in FIG. 7.

As illustrated in FIG. 7, a separation between different standoffs at lower formation resistivities may be viewed. This effect may be more pronounced if the frequency is lower. At higher formation resistivities, the dielectric effect in formation 132 (e.g., referring to FIG. 1) may cause a roll-off in measured impedance, as illustrated in FIG. 7. Operating in a linear region of the curve, displayed in FIG. 7, may produce a more accurate correspondence between the impedance image and that of the true formation resistivity. The standoff effect at low formation resistivities may cause an ambiguity in the interpretation of the impedance images. These raw measurements may be used, but the contrast of the resistivity image may be reduced. Furthermore, small errors in standoff measurements may cause a large difference in the impedance reading. It may be observed from FIG. 4 that measured impedance may begin to decrease as the formation resistivity increases. This "rolloff" may be caused by the dielectric effects in the formation 132 (e.g., referring to FIG. 1) and may become more pronounced at higher frequencies.

The graph in FIG. 7 illustrates that lower frequencies may be more suitable for measuring high formation resistivities while higher frequencies are more suitable to measure lower formation resistivities. For this reason, downhole tool 102, which may be a downhole imaging too, such as an oil based mud imager or water based mud imager, may generally be implemented as multi-frequency tools. Multi-frequency measurements may also reduce uncertainty in resolving different mud and formation properties through an inversion process. Operational frequencies of downhole tool 102 (e.g., referring to FIGS. 1 and 3) may be adjustable through a central control unit and may be changed based on the specifications of the job.

Figure 8:
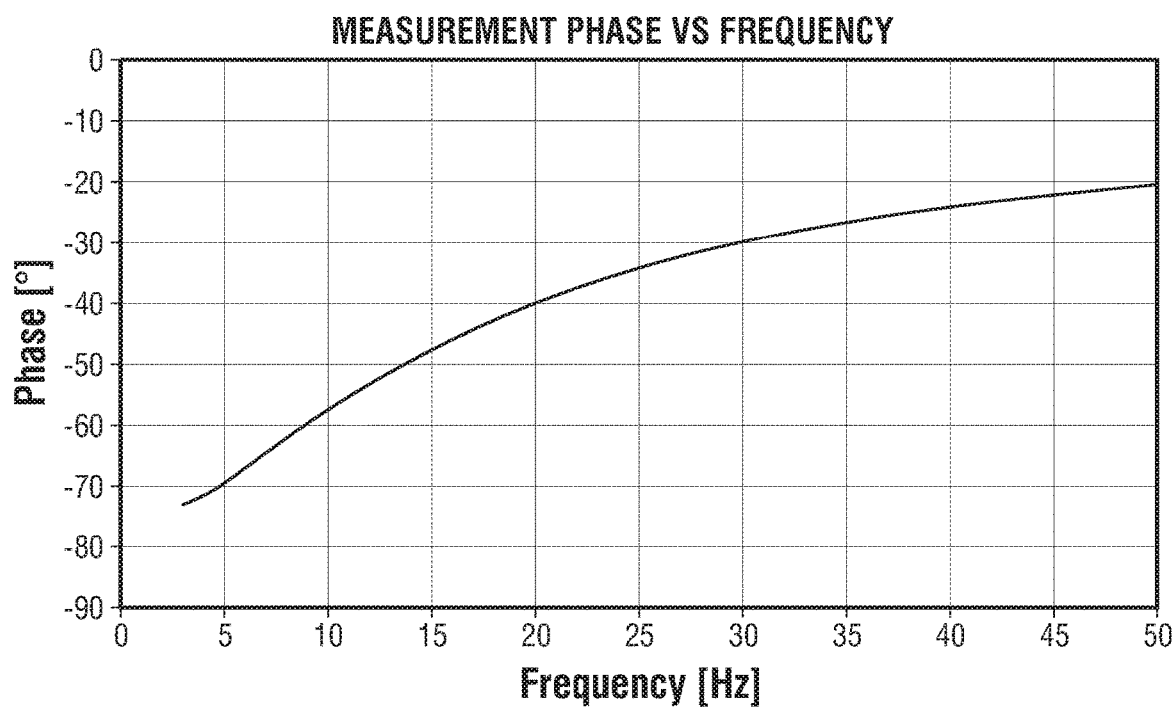
FIG. 8 is a graph illustrating a phase measurement of a downhole tool vs frequency.

FIG. 8 is a graph illustrating variation of the phase angle of the complex impedance of the downhole tool 102 (e.g., referring to FIG. 1) versus frequency is shown for a frequency range of 3 to 50 MHz. This model is obtained using the basic circuit model of downhole tool 102 outlined above. It may be seen that, in a typical operating range of downhole tool 102, phase response increases monotonically and smoothly. This ideal model is obtained using a formation resistivity of 1 Ω-m and a relative permittivity of 15 and an oil based mud resistivity of 8000 Ω-m and permittivity of 6.

Figure 9:
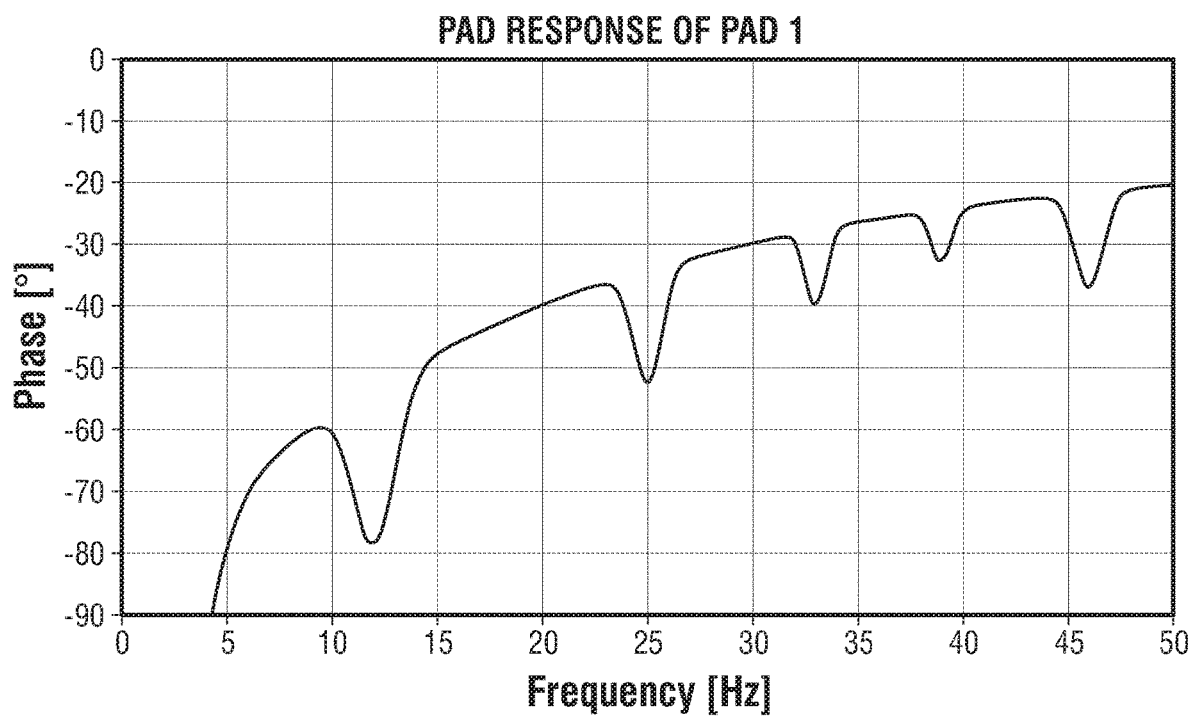
FIG. 9 is a graph illustrating average phase response of an injector electrode on a first pad.

FIG. 9 shows an example of how phase angle measurements taken by downhole tool 102 (e.g., referring to FIG. 1) may look like in a practical situation. FIG. 8 illustrates that a practical response deviates from an ideal response in the sense that multiple resonance frequencies are observed in the real measurements similar to what is shown in FIG. 9. Furthermore, the response differs between different pads 134 (e.g., referring to FIG. 1) while injector electrodes 204 (e.g., referring to FIG. 2) on a single pad show frequency behavior that is essentially same. Thus, measurements were obtained using the average response of each pad 134. Without limitation, described methods may be applicable when applied to individual measurements of each injector electrode 204.

Figure 10:
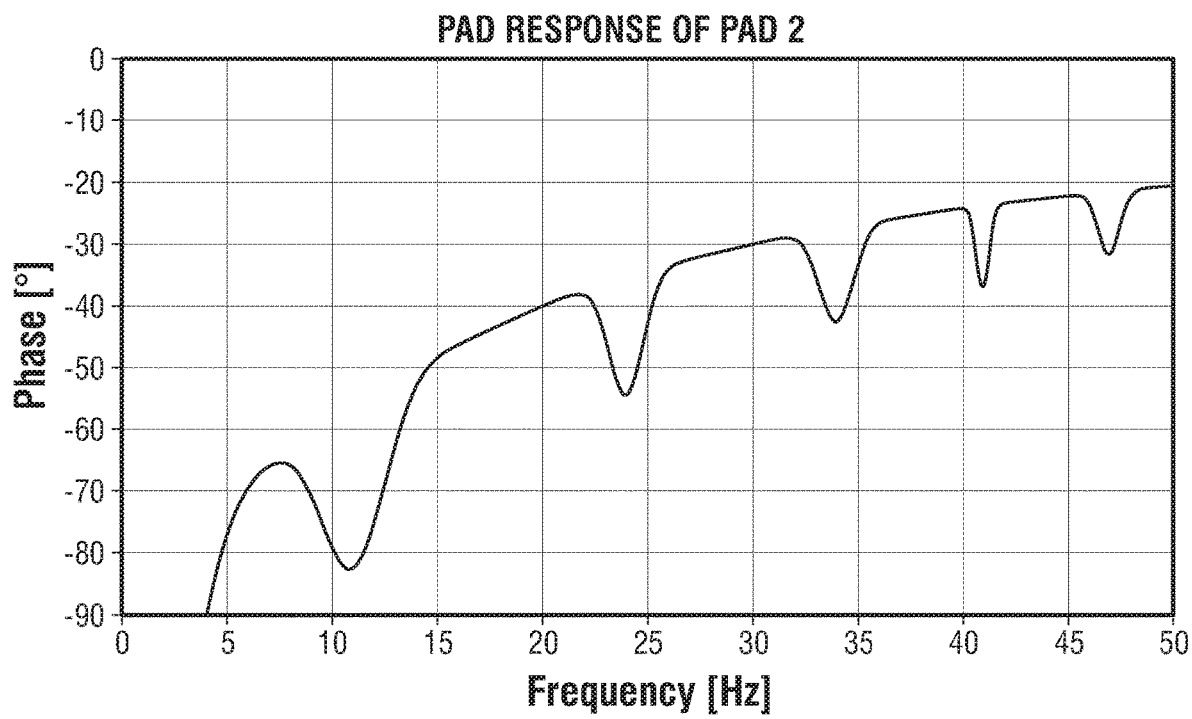
FIG. 10 is a graph illustrating average phase response of an injector electrode on a second pad.

While a pad 134, identified as pad 1 in FIG. 9, may show a response akin to that of FIG. 9, a second pad 134, identified as pad 2, may show a response akin to FIG. 10. Comparing FIG. 9 to FIG. 10 shows that resonance frequencies are shifted between different pads 134. Such effects are particularly pronounced if pads 134 are located on a different axial location on mandrel 140 (e.g., referring to FIG. 1). This arrangement is common in practice in order to increase the coverage of downhole tool 102 (e.g., referring to FIG. 1). In examples, downhole tool 102 may include two sets of 3 or 4 pads 134 each. Each pad 134 may be separated circumferentially while pads 134 of a first set and pads 134 of a second set are located at a rotated azimuthal angle with respect to the first set such that they provide azimuthal coverage in sections that are not covered by the first set. During measurement operations, it may be undesirable to operate close to resonance frequencies, which may lead to measurements taken by downhole tool 102 to change sharply. As downhole tool 102 is lowered or pulled up in borehole 124 (e.g., referring to FIG. 1), arms of downhole tool 102 continuously adjust to maximize contact between pad 134 and the wall of borehole 124. Additionally, the centralization of downhole tool 102 also changes constantly. Pressure and temperature changes lead to variations in the response of downhole tool 102 as well. If downhole tool 102 is operating close to a resonance frequency, these changes lead to a much greater effect on measurements taken by downhole tool 102. As a result, effective noise in the measurements increase and results degrade.

The primary reason for the occurrence of such a resonance may be the interaction between the pads 134 (e.g., referring to FIG. 1) and mandrel 140 of downhole tool 102 (e.g., referring to FIG. 1). This is confirmed through experimental observations. Large effects on tool performance were measured due to pad location with respect to other pads 134 as well as the positioning of pad 134 with respect to mandrel 140 (e.g., referring to FIG. 1). Experiments in isolating pad 134 from mandrel 140 using mechanical and electronical means further confirmed occurrence of such a resonance is based on an interaction between pad 134 and mandrel 140 of downhole tool 102 because it decreased the resonance behavior of downhole tool 102. Without limitation, mechanical isolation is intended to mean that the isolation is applied using a component that primarily serves a mechanical purpose. The intent of mechanical isolation for this matter is to block electrical coupling as well. As described below, several considerations have been taken to maximize isolation of pads 134 from the mandrel 140 of downhole tool 102.

One technique for isolation may be to electrically isolate pad 134 from mandrel 140 (e.g., referring to FIG. 1). The connection between pad 134 and mandrel 140 may be through any arm that connects pad 134 to mandrel 140, for example, upper arm 136 and lower arm 138 (e.g., referring to FIG. 1). In examples, upper arm 136 and lower arm 138 may be made of metal and therefore mandrel 140 and pad 134 are in electrical contact. To isolate these two parts, a break in the electrical contact may be introduced. An example of isolation is the use of an electrically non-conductive material at the contact point between on or more arms and pad 134. Without limitation, non-conductive material may be disposed anywhere along the arms to interrupt the electrical contact between pad 134 and mandrel 140. In examples, each arm that supports pad 134 may be made of an electrically non-conductive material as well.

Figure 11:
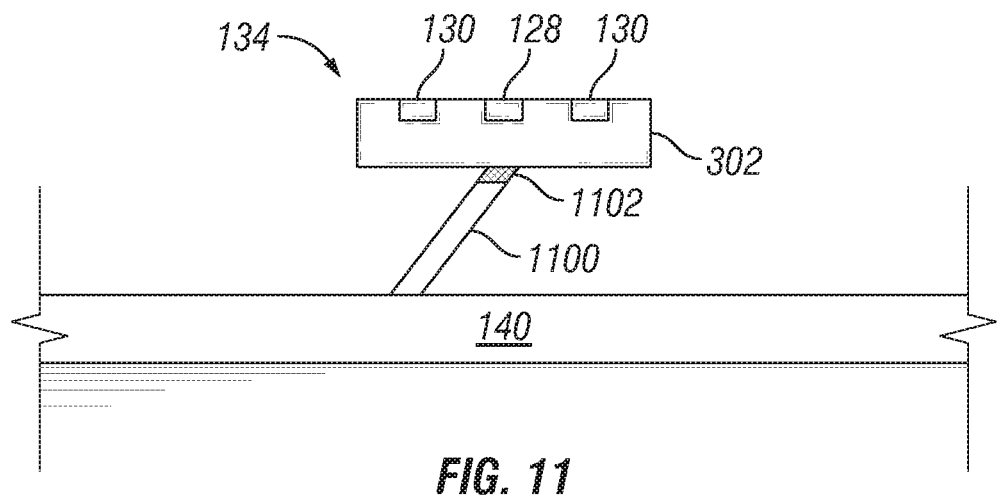
FIG. 11 illustrates a lower arm connected to the pad.
Figure 12:
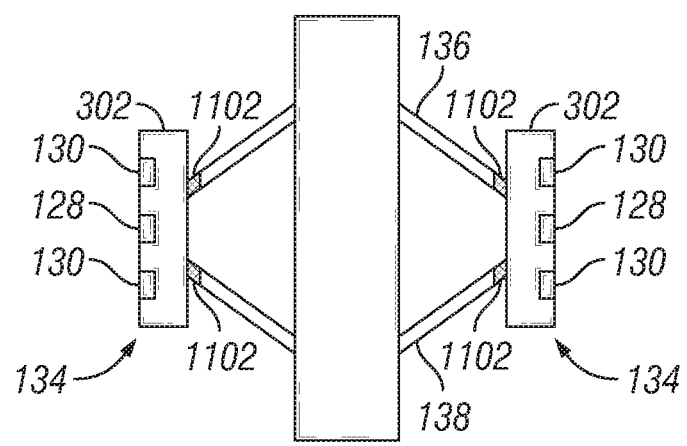
FIG. 12 illustrates the upper arm connected to the pad.

FIG. 11 illustrates an example of a system for electrically isolating pad 134 from mandrel 140 with a single arm 1100. FIG. 11 illustrates another example of a system for electrically isolating pad 134 from mandrel 140 with an upper arm 136 and a lower arm 138. As illustrated in FIGS. 11 and 12, a conductive path between pad 134 and mandrel 140 may traverse through single arm 1100, upper arm 136, and lower arm 138. Generally, single arm 1100, upper arm 136, and lower arm 138 may be made of metal, which may act as a conductive path and may allow mandrel 140 and pad 134 to be in electrical contact. To electrically isolate mandrel 140 and pad 134, a break in the electrical contact, the conductive path, may be introduced. For example, electrical isolation may be obtained utilizing an electrically non-conductive material 1102 such as a non-conductive ceramic or polyetheretherketone (PEEK). As illustrates electrically non-conductive material 1102 isolates two points of contact between housing 202 and single arm 1100, upper arm 136, or lower arm 138. Electrically non-conductive material 1102 may be a layer of non-conductive ceramic. Any suitable thickness of electrically non-conductive material 1102 may be used, in examples, ⅟₃₂ of an inch (1 millimeter) of electrically non-conductive material 1102 may be used. Electrically non-conductive material 1102 prevents metal to metal contact between housing 202 and single arm 1100, upper arm 136, or lower arm 138. A metal-to-metal contact may form a conductive path between housing 202 and mandrel 140 through single arm 800, upper arm 136, or lower arm 138. Electrically non-conductive material 1102 may break the conductive path, electrical contact, between housing 202 and mandrel 140 by preventing metal on metal contact. In examples, electrically non-conductive material 1102 may also be disposed at any suitable location on single arm 1100, upper arm 136, or lower arm 138 to interrupt the electrical contact between pad 134 and mandrel 140. Still further, single arm 1100, upper arm 136, or lower arm 138 may be made of an electrically non-conductive material. In examples with a single arm or more than two arms, any suitable combinations of mounting brackets, sections or arms or the entirety of arms may be made non-conductive to increase isolation.

In examples, to further electrically isolate pad 134 from mandrel 140, electronic connections (i.e., wiring) between pad 134 and mandrel 140 may be isolated. Wiring that may connect button array 128 and return electrode 130 to downhole tool 102 (e.g., referring to FIG. 1). In examples, information handling system 114 (e.g., referring to FIG. 1) may be disposed in and/or about downhole tool 102. Button array 128 and return electrode 130 may be connected to information handling system 114 through wiring. In examples, button array 128 and return electrode 130 may be connected to an information handling system 114 disposed on surface 108 (e.g., referring to FIG. 1) through downhole tool 102 and conveyance 110 (e.g., referring to FIG. 1). In examples, wiring may be disposed in insulated sheaths that may include ferrite material or isolation transformers may be disposed on the wiring to prevent current from moving between different components. Additionally, electrically isolating wiring disposed on pad 134 from mandrel 140 may be performed in a number of ways.

For example, connections on pad 134 may be identified as +V, having a positive voltage or −V, having a negative voltage. Positive voltage may be connected to individual injector electrodes 204 on button array 128 (e.g., referring to FIG. 3). Negative voltage may be connected to return electrode 130 and ground. Ground may be defined as the support structure of housing 302. In examples, to electrically isolate pad 134 from mandrel 140 none of the connections on pad 134 may be connected to mandrel 140 directly. Instead, the ground of housing 302 may be at least partially connected to main electronics, without limitation, information handling system 114, disposed in downhole tool 102.

In examples, main electronics disposed in downhole tool 102 (e.g., referring to FIG. 1) may be grounded to a chassis (not illustrated) either in direct contact and/or direct wiring, such as a ground wire. The chassis may be a structure inside downhole tool 102 which may act as structural support and/or protective support to electronics disposed in downhole tool 102. The chassis may then be grounded to mandrel 140 (e.g., referring to FIG. 1). To overcome the non-conducting mud and provide a capacitive coupling to formation 132 (e.g., referring to FIG. 1), high frequencies may be employed in downhole tool 102. This implies during operations downhole tool 102 may maintain a high impedance between the pad ground and the main electronics ground at higher frequencies while the lower frequency signals such as the power coming through mandrel 140 to pad 134 may be unimpeded. To electrically isolate the ground of pad 134 (such as housing 302) and the ground of mandrel 140 at a high frequency, an inductance sufficiently high to generate a k-Ohm range impedance at the frequency of operation may be placed in the line that connects the ground of pad 134 and the ground of the electronics disposed in downhole tool 102. The values of the inductance to obtain such an impedance value are in the tens of micro henrys. As discussed in more detail below, to facilitate the further tuning of pads 134 to ensure common operating frequencies for different pads 134, such inductances may be made variable.

With continued reference to FIGS. 11 and 12, an example to electrically isolate pad 134 from mandrel 140 (e.g., referring to FIG. 1) may include identifying a common mode of the voltage measurement between injector electrode 204 and return electrode 130 (e.g., referring to FIG. 3). Common mode is defined a voltage reference that is common for two measurement points whose differential voltage is calculated. Large variations of common mode voltage may occur in the measurement of the voltage between injector electrode 204 and return electrode 130, which may make current measurements inaccurate. For example, magnitude of the common mode voltage may be 50 times or higher than the magnitude of the differential voltage being measured. This would mean approximately 6 additional bits that needs to be accounted for the dynamic range of the measurement. To avoid large values of common mode voltage one of the two voltages +V and −V may be connected to the ground of pad 134, which may ensure that the common mode is limited. As discussed above, the isolation at high frequency between mandrel 140 and pad 134 may be obtained by introducing an impedance in the line that connects the grounds of pad 134 and the ground of electronics disposed in downhole tool 102.

The purpose of the connections explained in FIGS. 11 and 12 above avoid contact between pad 134 and mandrel 140 (e.g., referring to FIG. 1). Variations on the connections explained above that accomplish the isolation may also be used. Even though the above mechanical and electrical steps may have been implemented, downhole tool 102 (e.g., referring to FIG. 1). may still exhibit resonance issues, as there may be a limit to the isolation that may be achieved in such manner. For example, electrical, mechanical, cost, and design requirements may prevent an ideal response corresponding to the perfectly isolated case as shown in FIG. 6.

In those instances, it may be desired to operate at a frequency or frequencies that are not the resonance frequencies. These frequencies exhibit a more stable performance of downhole tool 102 (e.g., referring to FIG. 1) as mentioned above. Selection of the frequencies may be performed by, first, analyzing performance of downhole tool 102 versus frequency. For this, a frequency sweep may be performed. This frequency sweep may be done in a known, homogeneous formation with controlled standoff to minimize external effects which may create variations or noise in measurements. An ideal testing environment may be a large test tank filled with water, which may use a thin insulating tube that may separate downhole tool 102 from the fluid and mimic oil based mud or water based mud. However, performing the frequency sweep in such a controlled environment is not absolutely necessary. Resonance frequencies may also be identified, for example, downhole. In those instances, stationary measurements in a smooth zone such as a cased hole interval may provide the best data. The results of such frequency sweeps would be as shown in FIG. 9 and FIG. 10. Once such plots are obtained for each pad 134 (or each injector electrode 204, or any other desired operational group), it may be divided into frequency zones. For example, downhole tool 102 may operate at two frequencies, one lower frequency that may be less affected from the dielectric roll-off and one higher frequency that may be less affected by a standoff. Lower frequency zone may cover frequencies between 3-15 MHz as an example while the higher frequency zone may cover between 35-50 MHz as an example.

After determining frequencies for measurement operation, stable (non-resonant) frequencies may be found within the desired zones for each pad 134 (e.g., referring to FIG. 1). This may be performed by a visual inspection of an operator. Operator may select a frequency that is not close to a resonance frequency for every pad 134 for each of the predetermined frequency zones. As an example, for the examples shown in FIG. 9 and FIG. 10, analyst may pick 7 MHz as a relatively stable frequency for both pad 1 (e.g., referring to FIG. 9) and pad 2 (e.g., referring to FIG. 10) for the lower zone while 43 MHz may be selected as the frequency for the upper zone. Downhole tool 102 may be programmed to perform the logging in these two frequencies and the image of the formation may be obtained.

In examples, frequency selection may be automated. Without limitation, a functional fit to the measurement data away from the resonance zones may be obtained for each pad 134 (e.g., referring to FIG. 1). Such a function may be based on a predicted ideal response of downhole tool 102 (e.g., referring to FIG. 1), for example based on a circuit based approach that was described above. Additionally, a polynomial fit may be applied. For example, a polynomial order that may take most actual variations in the tool response into account without overly fitting the data may be selected. Such a polynomial order may be between 1 and 7. However, the actual order would be tool dependent and thus different orders may be more appropriate for different downhole tools 102. Once a polynomial fit with the determined order is fitted to data, such as in a least squares method, an error between the fit and the measurement data may be calculated. It is expected that measurements from highly resonant frequencies may deviate more significantly from such a fit. Thus, errors may be sorted and a percentage of the points with a higher error (such as 30%) may be excluded from a second polynomial fit. This second fit may fit the data that correspond to frequencies away from the resonances better. This approach may be repeated iteratively a number of times, such as 10 times, to find a better fit. Such a polynomial fit operation is computationally inexpensive so there should be no significant downside to increasing the number of iterations. However, results are expected to converge after a few iterations so the benefit of increasing the number of iterations is limited.

Figure 13:
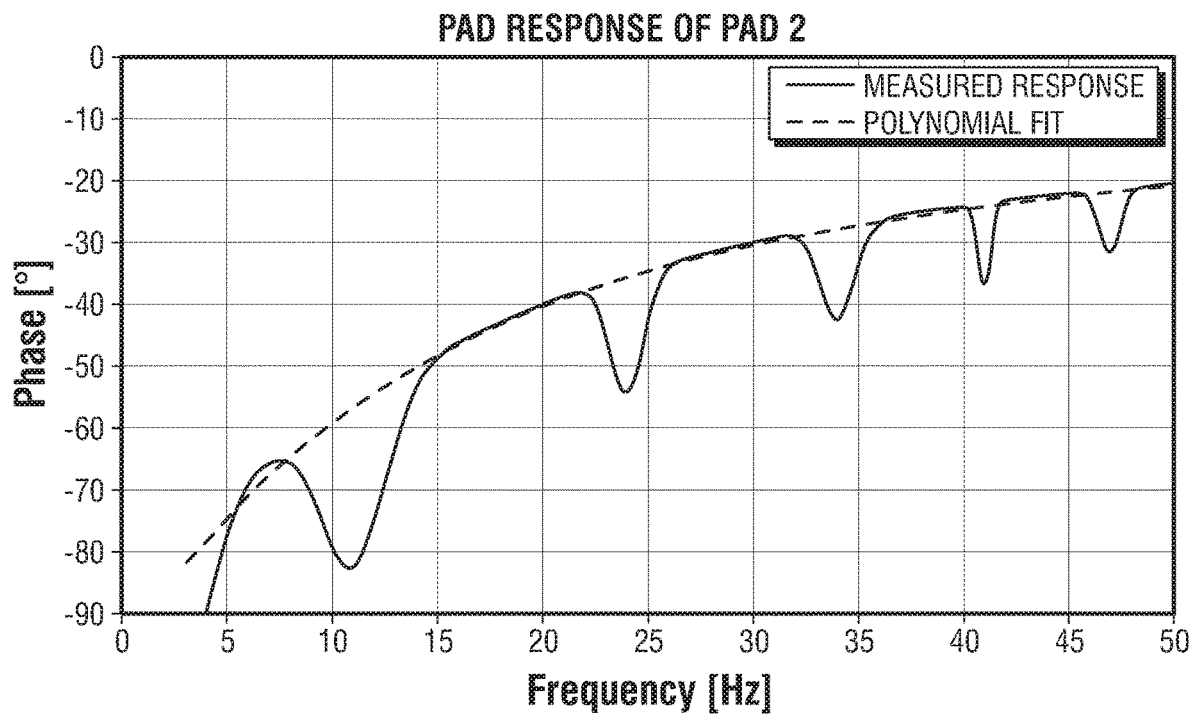
FIG. 13 is a graph illustrating applying a polynomial fit to a frequency sweep measurement.

Additional examples may include manual intervention for the above processes. An operator may adjust the thresholds (i.e. percentage of the data excluded from fit at each iteration) and the polynomial order or the operator may manually select the data that should not be included in the fitting process. FIG. 13 shows an application of the described procedure to the response shown in FIG. 10, using a polynomial order of 4. As illustrated in the graph of FIG. 13, a polynomial fit that is close to the ideal response is obtained.

Figure 14:
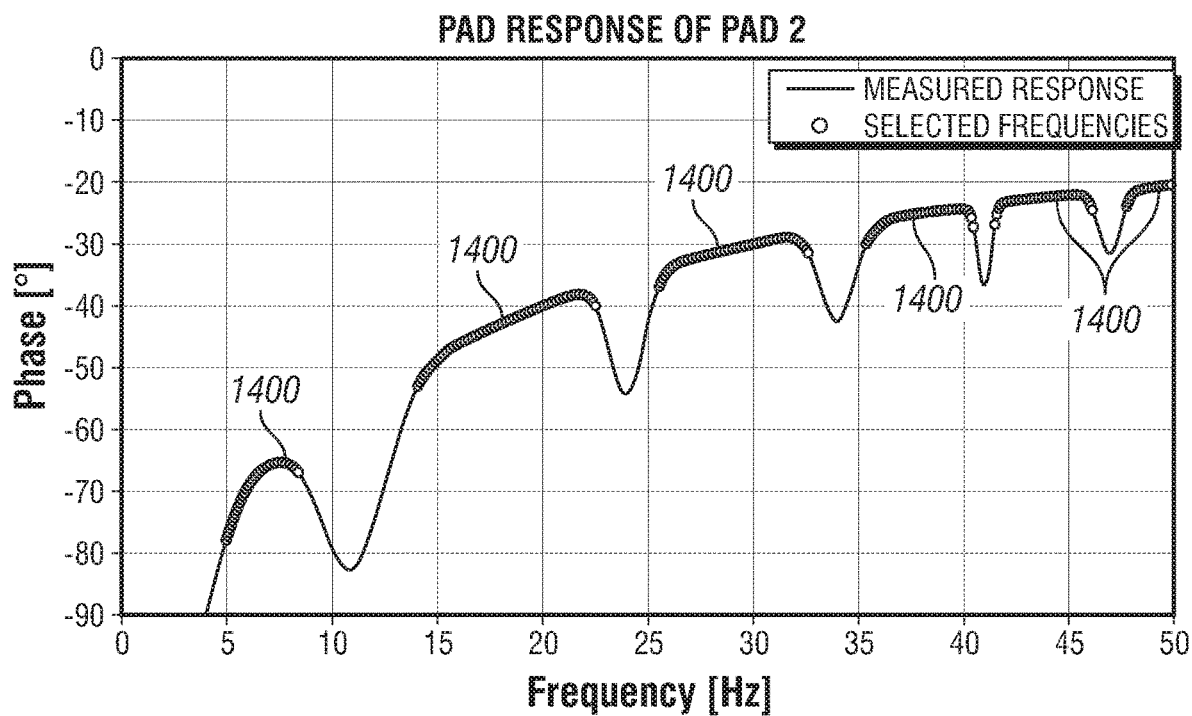
FIG. 14 is a graph illustrating frequencies found to be away from the resonance based on a polynomial fit.

Once the fit is obtained in the above manner, the frequency points that deviate significantly from the fit may be excluded from the fit process. For this, an absolute threshold may be used. For example, the frequencies that deviate 3 degrees from the fit may be deemed to be unstable. FIG. 14 shows the frequency points 1400 obtained using this procedure.

Another example for the determination of the operating frequencies may use the approximate slope of the change of measurement phase with respect to frequency. Absolute value of the approximate slope for the frequency point Fj (Sj) may be calculated in an example implementation by:

$$S_j = \frac{1}{2} \times \left| \frac{(\angle F_{j+1} - \angle F_j)}{(F_{j+1} - F_j)} + \frac{(\angle F_j - \angle F_{j-1})}{(F_j - F_{j-1})} \right| \quad (4)$$

Here, $\angle F_j$ denotes the phase angle of the measurement at frequency $F_j$. For the frequencies at the edges, one sided approximation for slopes may be used based on the difference between the nearest frequency point and the edge frequency. In examples, all the slopes may be calculated using just the forward or backward slopes instead of the average of forward and backward slopes. Then, points with absolute approximate slopes larger than a threshold may be thrown out to get rid of frequencies close to resonance. Threshold may be determined using an average or median of the absolute value of slopes. As an example, when the procedure described here is applied to FIG. 10, results shown in FIG. 15 may be obtained.

Figure 15:
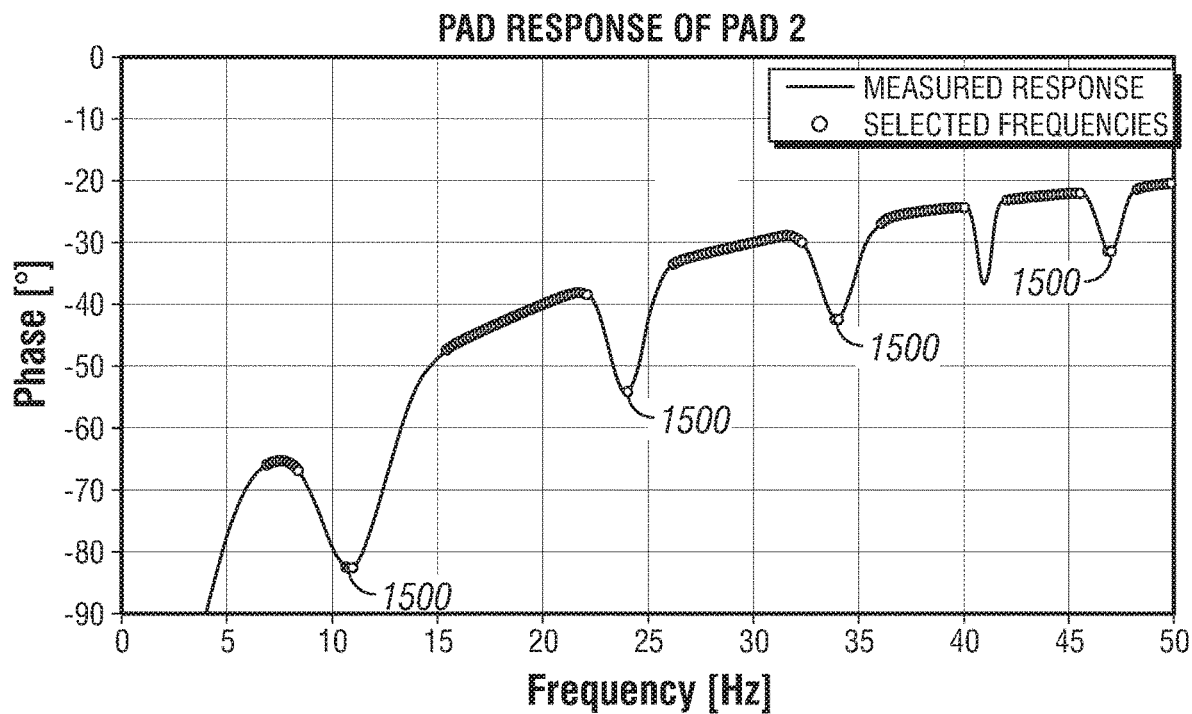
FIG. 15 is a graph illustrating a frequency selection based on an approximate slope method.

As illustrated in FIG. 15, a small strip of frequencies around the resonance are illustrated where the response has minima 1500 for reduced slopes. Such points may easily be eliminated using visual inspection or by discarding frequencies if the width of a frequency band with stable frequencies is too short.

Figure 16:
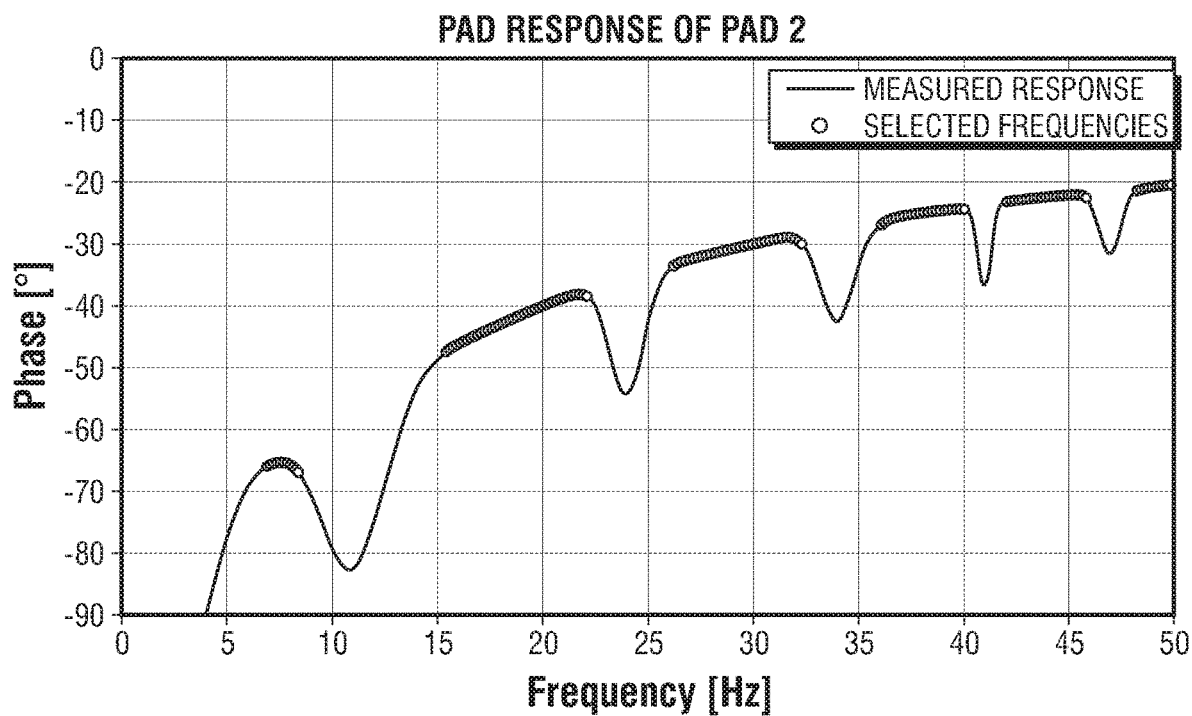
FIG. 16 is a graph illustrating a frequency selection based on a combination of a function fit and an approximate slope method.
Figure 17:
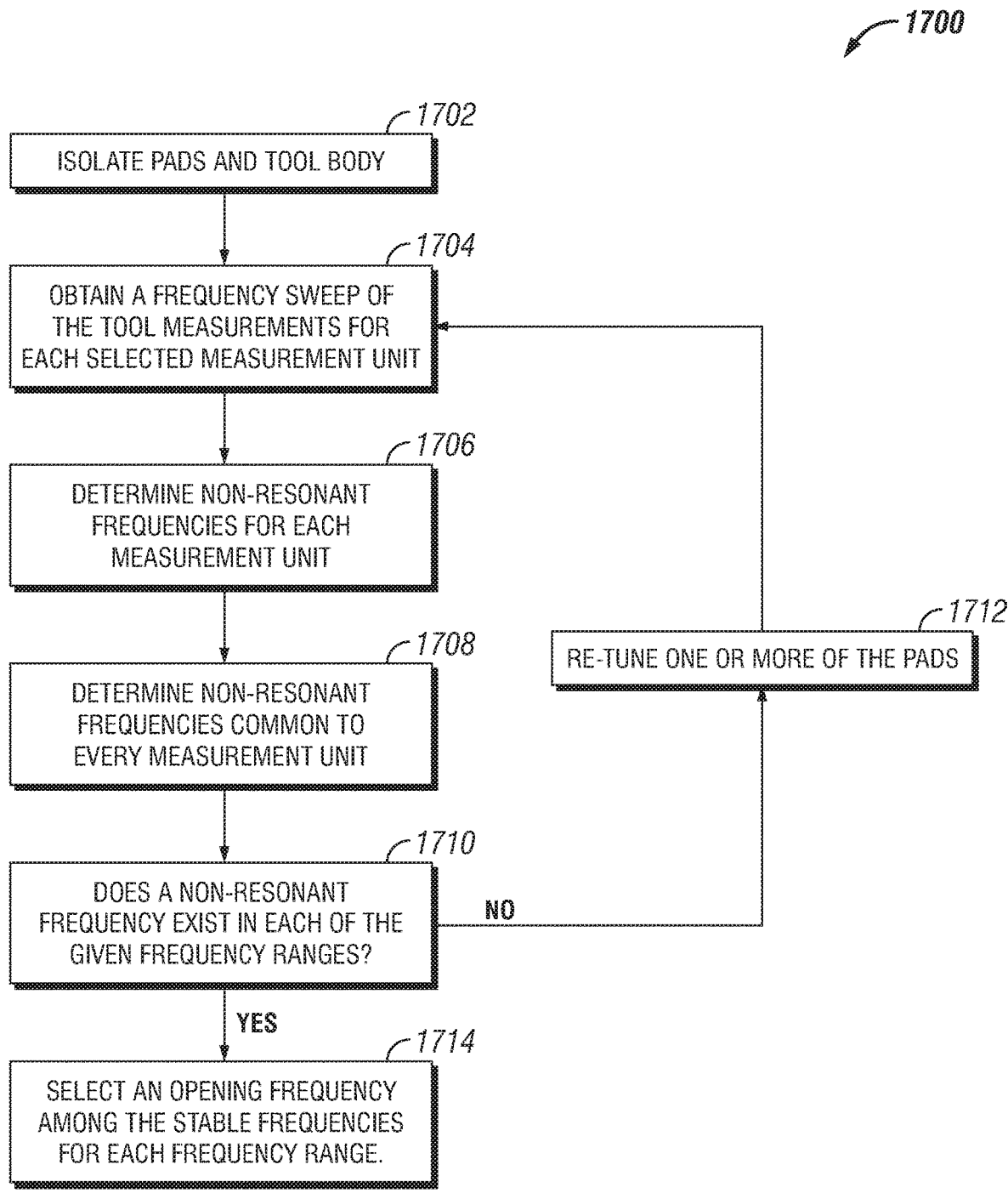
FIG. 17 is a workflow for isolating a pad from a mandrel on a downhole tool.

In another example, the previous two methods may be combined; e.g. a frequency point that satisfies both the approximate slope criterion as well as the polynomial fit criterion may be returned. The result of such an approach is shown in FIG. 16.

Once the stable frequencies (or frequency bands) are found for each of individual pad 134 (e.g., referring to FIG. 1), final stable frequencies that are selected for every pad 134 may be found. In a district frequency sweep, this is just the frequencies that are selected to be stable for every pad 134. Note that, in general pads' resonance frequencies were seen to be very similar unless they are separated axially. Since most tools in existence use two sets of pads 134 that are axially separated, in essence finding the final stable frequencies may be found by finding the intersection of these two separate set of pads 134. Thus, frequency sweeps may be performed for just one pad 134 in a set of pads at the same axial location, or the average of the measurements of all the pads 134 in a pad set may be taken. This may be applied to all pads 134 or even all injector electrodes 204 (e.g., referring to FIGS. 2 and 4) of all pads 134 (as mentioned before) otherwise in exactly the same manner as described.

After the determination of the stable frequencies, a selection of the final operating frequencies may be made among them. This selection may be made manually or automatically. For example, in the above example with two given frequency bands, the stable frequency that is closest to the center of the band may be selected. In another example, a stable frequency that is the lowest among the possible frequencies may be selected for the lower (3-15 MHz) frequency band, while for the higher frequency band (35-50 MHz) the highest stable frequency in the band may be selected. In another example, a chosen frequency may be an input (for example, 5 MHz for the lower band and 30 MHz for the upper band) and the frequency that is the closest to this target among the stable frequencies may be selected. These approaches may easily be extended to downhole tool 102 (e.g., referring to FIG. 1) that have more than two operating frequencies.

In examples, a common stable operating frequency may not be obtained between different pads 134 (or injector electrodes 204). In examples, pads 134 may be modified to adjust their phase response behavior. This may be done, for example, through a variable inductor or capacitor connected to the circuitry that connects the pad electronics ground and the downhole tool electronics ground. Once the resonance behavior is modified for one or more pads 134, the above steps may be repeated to find the stable operating frequencies.

FIG. 117 shows workflow 1700 for isolating pad 134 from mandrel 140 (e.g., referring to FIG. 1). Workflow 1700 may begin with block 1702. In block 1702, pad 134 and mandrel 140 are mechanically isolated from each other, as described above. After mechanically isolating pad 134 from mandrel 140, there may still be resonance issues. In block 1704, a frequency sweep is performed on measurements from downhole tool 102 for each selected measurement unit. It should be noted that "measurement unit" is a general term that encompass all possible implementations, such as, measurements of individual injector electrodes 204, average measurement of each injector electrode 204 on a pad 134 or the average measurement of each pad 134 for a set of pads 134 at the same axial location. In block 1706, non-resonant frequencies are determined for each measurement unit. Next, in block 1708, non-resonant frequencies common to every measurement unit are determined. In block 1710 it is determined if a non-resonant frequency exist in each of the given frequency ranges. In block 1712, If a suitable frequency is not found, one or more of the pads 134 should be tuned to alter their resonance frequency. In examples, tuning would involve changing the tuning inductor of each pads 134 in a set of pads 134 in approximately the same amount while leaving other pads 134 in a second set of pads 134 that is axially displaced from the first set as is in a common two pad set configuration. Then blocks 1704 to 1710 are repeated. If a non-resonant frequency exists in each of the given frequency ranges in block 1710, then in block 1714 an operating frequency is elected form among the stable frequencies for each frequency range.

In an alternate embodiment for selecting the common stable frequencies between different pads 134 (or another measurement unit), a cost function approach may be used. Cost function may be a weighted combination of a term based on the norm of the distance of a given frequency to the desired operating frequency plus a term quantifying the stability of the given frequency for each pad. This second term may be based on the norm of the error between the measured phase response and an approximation to the ideal phase response using a function fitting process as described above. Frequencies that minimize the cost function in given frequency bands may be selected as the operating frequencies.

In examples, additional mechanical isolation of pad 134 from mandrel 140 may be performed by utilizing insulation transformers for the connection between the pad electronics and tool electronics to further improve the electrical isolation of the tool. Additionally, ferrite sleeves or ferrite chokes may be wrapped around portions of mandrel 140 or the arms of pads 134 to further increase the isolation.

As described above, that the phase response of downhole tool 102 has been used as the indicator of the resonance throughout the disclosure. In examples, a frequency sweep of signals with similar information may also be used to determine resonance frequencies and apply the described method. For example, a sweep of the absolute value of the signal may be performed instead.

Response of downhole tool 102 may exhibit differences based on manufacturing tolerances, mandrel configuration etc. Thus, described technique may be applied to each manufactured tool separately and optimal frequencies unique to each downhole tool 102 may be determined. The systems and methods may include any of the various features for electrically isolating a pad from a mandrel using the systems and methods disclosed herein, including one or more of the following statements.

Statement 1: A method for identifying an operating frequency may comprise performing a frequency sweep using one or more injector electrodes disposed on a downhole tool, recording one or more measurements from the frequency sweep, identifying one or more stable frequencies from the frequency sweep, and identifying one or more operating frequencies from the one or more stable frequencies.

Statement 2. The method of statement 1, wherein the identifying one or more stable frequencies are found by calculating a fit to the one or more measurements that approximate an ideal response, wherein the fit is a polynomial fit.

Statement 3. The method of statements 1 or 2, wherein the one or more injector electrodes are electrically isolated on the downhole tool.

Statement 4. The method of statements 1-3, wherein the identifying one or more stable frequencies are found by calculating a slope of the one or more measurements.

Statement 5. The method of statements 1-4, wherein the identifying one or more stable frequencies are found by visual inspection of the one or more measurement from the frequency sweep.

Statement 6. The method of statements 1-5, wherein the one or more operating frequencies are found by selecting the one or more stable frequencies closest to one or more predetermined frequencies.

Statement 7. The method of statements 1-6, wherein the one or more operating frequencies are found by minimizing a cost function.

Statement 8. The method of statements 1-7, wherein the one or more injector electrodes are disposed on one or more pads of the downhole tool.

Statement 9. The method of statement 8, further comprising identifying the one or more stable frequencies that are common to the one or more injector electrodes.

Statement 10. The method of statements 1-8, wherein the frequency sweep is performed in a test tank.

Statement 11. The method of statements 1-8 or 10, wherein the frequency sweep identifies a phase angle of the one or more measurements.

Statement 12. A system for electrical isolation may comprise a downhole tool. The downhole tool may comprise mandrel, a chassis disposed in the mandrel, and first set of electronics disposed in the chassis. The downhole tool may further comprise a pad. The pad may comprise a housing, wherein the housing is at least partially metal, a second set of electronics disposed within the housing, a mounting bracket, wherein the mounting bracket is disposed on the housing, at least one injector electrode disposed on the housing and electrically isolated from the housing, and at least one return electrode disposed on the housing and electrically isolated from the housing. The downhole tool may further comprise an arm, wherein the arm is attached to the mounting bracket and the mandrel, an electrically non-conductive material, wherein the electrically non-conductive material is disposed between the pad and the mandrel, and an information handling system connected to the pad through the first set of electronics and the second set of electronics. The information handling system may be configured to perform a frequency sweep with the at least one injector electrode, record one or more measurements from the frequency sweep with the at least one return electrode, identify one or more stable frequencies from the frequency sweep, and identify one or more operating frequencies from the one or more stable frequencies.

Statement 13. The system of statement 12, wherein the electrically non-conductive material comprises a non-conductive ceramic or polyetheretherketone.

Statement 14. The system of statements 12 or 13, wherein the first set of electronics and the second set of electronics are isolated from each other by one or more isolation transformers or one or more inductors.

Statement 15. The system of statements 12-14, wherein the first set of electronic and the second set of electronics are isolated from each other by one or more inductors that are variable.

Statement 16. The system of statements 12-15, wherein the arm is the electrically non-conductive material.

Statement 17. The system of statements 12-16, wherein the information handling system is configured to identify a phase angle of the one or more measurements of the frequency sweep.

Statement 18. The system of statements 12-17, wherein the mounting bracket further comprises a pivot point and a pin.

Statement 19. The system of statement 18, wherein the mounting bracket is the electrically non-conductive material.

Statement 20. The system of statements 12-17 and 18, wherein the information handling system is configured to identify the one or more stable frequencies by calculating a fit to the one or more measurements that approximate an ideal response, wherein the fit is a polynomial fit.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   performing a frequency sweep using one or more injector electrodes disposed on a pad, wherein the pad is connected to a downhole tool;
   recording two or more measurements at two or more frequencies from the frequency sweep, wherein the frequency sweep continuously changes the two or more frequencies of the downhole tool over at least one frequency range;
   identifying one or more frequencies from the frequency sweep;
   setting one or more operating frequencies of the downhole tool as the one or more frequencies; and
   performing one or more measurements downhole at the operating frequencies of the downhole tool.

2. The method of claim 1, wherein the identifying one or more stable frequencies are found by calculating a fit to the one or more measurements that approximate an ideal response, wherein the fit is a polynomial fit.

3. The method of claim 1, wherein the one or more injector electrodes are electrically isolated from the downhole tool.

4. The method of claim 1, wherein the identifying one or more stable frequencies are found by calculating a slope of the one or more measurements.

5. The method of claim 1, wherein the identifying one or more stable frequencies are found by visual inspection of the one or more measurement from the frequency sweep.

6. The method of claim 1, wherein the one or more operating frequencies are found by selecting the one or more stable frequencies closest to one or more predetermined frequencies.

7. The method of claim 1, wherein the one or more operating frequencies are found by minimizing a cost function.

8. The method of claim 1, wherein the one or more injector electrodes are disposed on one or more pads of the downhole tool.

9. The method of claim 8, further comprising identifying the one or more stable frequencies that are common to the one or more injector electrodes.

10. The method of claim 1, wherein the frequency sweep is performed in a test tank.

11. The method of claim 1, wherein the frequency sweep identifies a phase angle of the one or more measurements.

12. A system for downhole imaging, comprising:
    a downhole tool, wherein the downhole tool comprises:
       a mandrel;
       a chassis disposed in the mandrel; and
       a first set of electronics disposed in the chassis;
    a pad, wherein the pad comprises:

a housing, wherein the housing is at least partially metal;
a second set of electronics disposed within the housing;
a mounting bracket, wherein the mounting bracket is disposed on the housing;
at least one injector electrode disposed on the housing and electrically isolated from the housing; and
at least one return electrode disposed on the housing and electrically isolated from the housing;
an arm, wherein the arm is attached to the mounting bracket and the mandrel; and
an electrically non-conductive material, wherein the electrically non-conductive material is disposed between the pad and the mandrel; and
an information handling system connected to the pad through the first set of electronics and the second set of electronics, wherein the information handling system is configured to:
perform a frequency sweep with the at least one injector electrode;
record one or more measurements from the frequency sweep with the at least one return electrode;
identify one or more frequencies from the frequency sweep; and
identify one or more operating frequencies from the one or more frequencies.

13. The system of claim 12, wherein the electrically non-conductive material comprises a non-conductive ceramic or polyetheretherketone.

14. The system of claim 12, wherein the first set of electronics and the second set of electronics are isolated from each other by one or more isolation transformers or one or more inductors.

15. The system of claim 12, wherein the first set of electronic and the second set of electronics are isolated from each other by one or more inductors that are variable.

16. The system of claim 12, wherein the arm is the electrically non-conductive material.

17. The system of claim 12, wherein the information handling system is configured to identify a phase angle of the one or more measurements of the frequency sweep.

18. The system of claim 12, wherein the mounting bracket further comprises a pivot point and a pin.

19. The system of claim 18, wherein the mounting bracket is the electrically non-conductive material.

20. The system of claim 12, wherein the information handling system is configured to identify the one or more stable frequencies by calculating a fit to the one or more measurements that approximate an ideal response, wherein the fit is a polynomial fit.

* * * * *